(12) United States Patent
Lippelt

(10) Patent No.: US 6,937,850 B2
(45) Date of Patent: Aug. 30, 2005

(54) METHOD AND APPARATUS FOR CHARGING OF COMMUNICATIONS SERVICES

(75) Inventor: Hans-Peter Lippelt, Neuss (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 347 days.

(21) Appl. No.: 10/330,641

(22) Filed: Dec. 27, 2002

(65) Prior Publication Data

US 2004/0127194 A1 Jul. 1, 2004

Related U.S. Application Data (63) Continuation of application No. PCT/EP01/07141, filed on Jun. 23, 2001, now abandoned.

(30) Foreign Application Priority Data

Jun. 29, 2000 (EP) .............................................. 00113782

(51) Int. Cl.[7] ........................ H04M 11/00; H04M 15/00
(52) U.S. Cl. ....................................... 455/408; 455/406
(58) Field of Search ................................. 455/406, 407, 455/408, 432.1, 433, 435.1, 437, 438; 379/111, 114.01, 114.2, 144.01

(56) References Cited

U.S. PATENT DOCUMENTS

2004/0132449 A1 * 7/2004 Kowarsch ................ 455/432.1
2004/0185826 A1 * 9/2004 Koskinen et al. ........... 455/406

* cited by examiner

*Primary Examiner*—Binh Tieu (57) ABSTRACT

The invention provides a charging method for a communications service in a cellular communications system, especially for a prepaid communications service. A prepaid service processing node (PSPN) processes a communications service. A prepayment support node information (PI) is received from a subscriber profile database (SPD). A prepayment support node address (PA) is determined from the prepayment support node information (PI). The determined prepayment support node address (PA) is stored. A request for the communications service to be charged on a subscriber's prepayment account is detected, and a credit information request is sent to a prepayment support node (PPSC) identified by the stored prepayment support node address (PA). A credit information is received, and the requested communications service is processed according to the credit information. The invention provides a device for said charging as well.

26 Claims, 4 Drawing Sheets

METHOD AND APPARATUS FOR CHARGING OF COMMUNICATIONS SERVICES

CLAIM OF PRIORITY UNDER 35 U.S.C. § 120

This is a continuation of International Application PCT/EP01/07141, with an international filling date of Jun. 23, 2001, published in English under PCT article 21(2) and now abandoned. Priority is hereby claimed under 35 U.S.C. § 120 to PCT application serial no. PCT/EP 01/07141 filed Jun. 23, 2001 and priority EPO application serial no. 00113782-7 filed on Jun. 29, 2000.

FIELD OF THE INVENTION

The present invention relates to communications services, particularly to a method and a network node for charging of communications services.

BACKGROUND OF THE INVENTION

Prepaid services in modern telephone networks allow network operators to issue subscriptions on a prepaid basis. A prepaid service account contains an amount of charging value that can be used to pay for outgoing calls as well as for incoming calls. A prepaid service account can have an expiration date. Calls can be made with the account as long as the call limitations are not exceeded. Examples for call limitations are an empty account or a passed expiration date. Call charges are automatically deducted from the account. The account can be refilled with charging value for continued usage.

Prepaid Services may be offered to customers not wanting a permanent subscription or to customers who for some reason cannot get credit approval. In mobile communications networks, prepaid services are particularly useful for car rental agencies, travel agencies or organisers of fairs and seminars. These companies can in turn supply their customers with the prepaid account.

U.S. Pat. No. 6,029,062 discloses a charging method for a communications service in a communications system, wherein a prepay call management platform which is directly coupled to a telecommunications carrier switch processes a communications service. After detecting for a roaming subscriber a request for a call to be charged on the subscriber's prepayment account, the call is transferred to a home prepay platform of the communications network by sending data to the home prepay platform, which computes a credit information. The credit information is sent to the prepay call management platform, which processes the call according to the credit information.

WO 99/30480 describes a method and system for providing prepaid and credit-limited telephone services. Apart from a real-time telephone call monitoring, rating and response system, it provides a billing system maintaining accounts and associated service profiles for subscribers. The billing system can obtain temporary customer profiles for roamers visiting the service territory of the host telephone service provider. For serving roaming subscribers, customer service information like credit limit and prepaid balance are for each account provided by a roamer clearinghouse, which is a central, regional or nationwide or international database.

In the state of the art, a solution for providing prepaid services in a fixed network is based on the Intelligent Network (IN), as described in WO 98/27715. A prepaid service originating call is routed by the terminal exchange (TE) to a service switching point (SSP), which requests connection time from a prepaid services account kept at a service control point (SCP). The SCP, which analyses the cost of the call and checks the account balance, sends information on the length of the connection time assigned to the call to the SSP and deducts the account in real time during the call. During the connection, the SSP monitors the elapsing of the connection time assigned per request, and when the assigned connection time is less than a specific threshold, an additional time request is sent to the SCP. The SCP updates the account balance, when the connection is terminated.

A cellular communications system can comprise a HPLMN, as well as additionally at least one VPLMN. As designed for a fixed network, the described prepayment method is not suited for a cellular communications system, in which subscribers regularly move within their home public land mobile network (HPLMN) as well as into and within visited public land mobile networks (VPLMNs), because the corresponding roaming is not supported.

As an additional disadvantage, the communications network must support an IN architecture providing SSPs with service switching functions, at least one SCP with-a service control function and a service management point (SMP) with a service management function. All interfaces are vendor specific. Therefore, the interface to access the prepaid service accounts is vendor specific as well, which limits compatibility within the network. Furthermore, the amount and complexity of signalling messages exchanged between SSP and SCP is high. Also, the dialogue between these nodes must be kept during the whole call, which binds network resources. In addition, it is difficult to charge not only the call duration, but also events like supplementary services and short message services (SMS), because the SCP does not get the corresponding signalling information.

As described in Mouly, Pautet, The GSM System for Mobile Communications, ISBN 2-9507190-0-7, chapter 9.1.2, pp 572–577, another method for payment of communications services in GSM is the creation of toll ticketing (TT) records in a mobile switching centre (MSC) and their transfer by tape or electronic transfer to a node controlling user accounts. This method is not real-time oriented, because the service is executed before the TT records are sent to the node that is controlling user accounts and the records arrive always with a certain delay. Therefore, also in the case of electronic transfer of toll tickets there is, for an operator maintaining a prepaid account and depending on the billing strategy for a call, a risk either of overcharging the account or of undercharging due to an empty prepaid account. Although an operator of a HPLMN might take the latter risk, usually a VPLMN operator will not. Therefore, roaming of a prepaying subscriber cannot be granted.

Another known method for prepayment of communications services is to store the subscribers credit on a smart card in the terminal. This method is less convenient to the service provider due to a lack of control and a certain fraud potential. A high effort is necessary to avoid this risk. A smart card-based prepaid system is described in the article 'Natel D Easy', ComTec, vol. 2, 1997, p.16–20.

SUMMARY OF THE INVENTION

It is an object of the present invention to overcome the above described problems and to provide a charging method and device, particularly in mobile communications systems, which support roaming of subscribers both within their home communications network and within as well as into different networks for all types of chargeable services in a cellular communications system.

The present invention provides a charging method for a communications service in a cellular communications system, especially for subscribers having a prepaid service account that is administrated by a prepayment support node PPSC of the communications system. The invention can be used to charge all types of chargeable services. A network node, which processes prepaid services is called in the following a prepaid service processing node PSPN. Any network node of a communications system can be a PSPN. Subscriber data like the subscriber type, e.g. 'prepaying subscriber permitted for international roaming', and further data, like the address PA of the PPSC, which administrates the corresponding prepaid service account, are stored in a subscriber profile, which is stored in a subscriber profile database SPD. The subscriber profile database SPD can be centralised as well as decentralised. It is usually located in the HPLMN of the subscriber. Apart from a database for subscriber profiles, the SPD can perform other functions, e.g. functions of an HLR of a GSM system.

In a cellular communications system, the mobility of subscribers has to be ensured by routines like handover, national roaming and international roaming. The present invention supports all of these traffic cases, while facilitating reliably chargeable prepaid services for mobile subscribers. It supports all types of cellular communications systems, e.g. the well-established GSM system and the currently developed UMTS system. It is applicable for services like High Speed Circuit Switched Data Service HSCSD, General Packet Radio Service GPRS and Voice over Internet VoIP.

According to the present invention a PSPN, which processes communications services in the communications system, receives from the subscriber profile database SPD for a specific subscriber a Prepayment support node information PI. This can be triggered by and preferably be executed within a registration procedure that is performed when the subscriber enters the service area of the PSPN. A subscriber can enter the service area of a PSPN by location update, by handover or by switching on of his mobile station. The PSPN determines after reception of the Prepayment support node information PI a PPSC address PA and stores it. After detecting a request for a communications service, which is to be charged on a subscriber's prepayment account, the PSPN sends a credit information request to the identified PPSC by the prepayment support node address PA. After reception of the requested credit information, the PSPN processes the requested communications service according to the credit information.

Apart from a processing unit for processing prepaid communications services, the PSPN comprises a signalling interface SI to send and receive signalling information, e.g. the Prepayment support node information PI, the credit information request and the credit information itself. A determination unit determines a PPSC address PA of a prepayment support node PPSC from a Prepayment support node information PI that is received via the signalling interface SI, and a memory M stores the address. A request handler RH detects requests of communications services to be charged on a prepayment account. A credit information handler CH sends credit information requests to the PPSC identified by the stored prepayment support node address PA and receives the corresponding credit information. A controller CR is responsible for the controlling of the processing of requested communications services according to the credit information and for the controlling of a charging of the communications service.

The present inventions allows operators of communications networks to offer reliably chargeable prepaid communications services to subscribers, while at the same time profiting by the high performance because a low number and low complexity of signalling messages are needed. Network resources, in particular for signalling, are used to a minor extent only. Therefore, the present invention can easily fulfil the real-time requirements of modern communications networks. The solution is flexible, i.e. there is no need for a certain network architecture supporting prepaid services. It is vendor-independent and applicable also for use in future systems.

The present invention allows for an entire range of charging, i.e. all services like bearer services, tele services and supplementary services can be charged. The same applies to events like short messages. The proposed solution can be used to charge prepaid services to service originating subscribers as well as to call forwarding subscribers and to subscribers at which the service terminates.

The PSPN gets to know the PPSC addresses PA of prepaying subscribers, which are currently in its service area. This allows the sending of credit information requests to the appropriate PPSC without delay. The availability of the PPSC address PA to the PSPN is independent of the network, i.e. HPLMN or VPLMN, to which the PSPN belongs. Therefore, the roaming of prepaying subscribers is supported by the proposed solution, which is essential for operators promoting subscriber mobility.

Prepaid services processing capabilities of the PSPN are sent to the SPD. The check of the prepaid services processing capabilities of the PSPN is especially useful in the case of mobile terminating services, if fees are to be charged to the so-called B-party, i.e. the subscriber on the service terminating side. Depending on the roaming agreements between network operators, this charging model applies in particular to international roaming. If the SPD knows the prepayment charging capability of the PSPN serving the B-party, the SPD can decide either to allow a certain communication service, in particular a B-party terminating communication service, or to reject such a service request, e.g. if the corresponding PSPN is not able to charge a required fee.

Processing of the requested communications service can comprise a controlling of a charging by different prepayment methods. An operator is flexible in the design of his prepayment tariff models. As apart from prepayment based on credit information also, e.g., toll-ticketing payment can co-exist, it is possible to charge for a prepaid service both a basic fee (e.g. via toll ticketing) and a variable fee via the described credit information interrogation.

Prepayment support node information PI comprises charging information about different types of communications services, and the requested prepaid communications service is processed according to this charging information. The processing can be performed by a PPSN. The PSPN may apply individual fees, preferably in the form of credits, to each of the prepaying subscribers it is currently responsible for. Usually, operators offer a broad range of different contracts to their customers, providing different fees for the same communications services. If the PSPN knows the fees, which are valid for an individual subscriber, or their corresponding values to be charged for certain services, it can support a reliable service charging.

The credit information comprises an allowed amount of airtime. Advantageously, this supports an easy processing of prepaid services at the PSPN for time-based charging, like in GSM. The PSPN is not required to calculate from given monetary values the corresponding time that a service is allowed to consume, because the allowed amount of airtime is directly provided by the PPSC. Furthermore, any need for currency conversions is avoided in the case of international roaming subscribers.

In an embodiment wherein the credit information comprises an allowed amount of traffic volume, there are certain advantages. A PSPN of a volume-based charging network like GPRS can directly process a certain traffic volume, e.g. in terms of bytes, which is allowed from the PPSC for a particular subscriber in response to a credit information request.

The credit information of the present invention comprises an approval or a rejection of the processing of the requested communications service. According to a preferred embodiment, a disconnection handler may terminate the communications service if the credit information comprises a rejection. Advantageously, the approval or rejection information allows an effective prepaid processing of events, e.g. of short messages. Usually, there is a fixed fee for discrete communications services. Therefore, the PSPN does not require redundant tariff information or amounts of granted airtime or traffic volume to process such services. Instead, a determination of whether the processing of the requested event is permitted, is sufficient.

In another embodiment, a credit value, which is received in the credit information, is consumed according to the processed communications service. The credit value can represent, e.g., a time value or a traffic volume. The consumption can be made in discrete steps or continuously. Therefore, corresponding charging models can flexibly be used and are open for easy changes by an operator.

In a further embodiment, an additional credit information request is sent to the PPSC, whenever a remaining credit, which is calculated by a deduction of the consumption from the granted credit value, falls below a first threshold. According to the embodiment the credit information handler takes care of this task. The detection of an exhausted credit can avoid an unpaid service execution, e.g., if it triggers a stop of processing of the communications service.

Advantageously, these embodiments allow a stepwise fetching of credits, e.g. airtime or traffic volume. Usually, the PPSC checks the current prepaid account balance prior to a response to a credit information request. Then the PPSC performs an account update, i.e. a deducting from the prepayment account, after a confirmation of the service termination is received. Therefore, if the operator allows parallel prepaid communications services for a single user to be charged on the same prepaid account, or if the operator provides family accounts or supports a so-called multi-party service, there exists a certain risk of unpaid service executions. That is, there is a risk if the PPSC deducts the account after corresponding confirmations of service executions are received. The stepwise fetching of credits reduces this risk, if the PPSC deducts the account stepwise as well. For instance, if airtime is fetched in steps of 1 minute each, the risk is minimised to an unpaid airtime of 1 minute, when the prepayment account becomes empty. If the PPSC deducts the account after granting of the credit before a service execution by the PSPN and reimburses a rest, which is not consumed by the processed service after a service execution confirmation is received, the risk of rejecting requested parallel services due to an empty account is minimised by the stepwise fetching of credits.

The PSPN, in a further embodiment, receives an account warning sent by the PPSC, if the credit value of the subscriber account falls below a second threshold. The PSPN sends an announcement of a low account credit to the subscriber's communications device, which has requested the communications service. According to the embodiment, an announcement handler of the PSPN is responsible for sending this announcement. Advantageously, the subscriber can be informed by these embodiments about a possible forced service termination in advance.

In another embodiment, a service termination information is sent to the PPSC, when the processed communications service has been terminated. The controller is responsible for this task. Advantageously, this allows for an accurate billing of the executed service at the PPSC, in particular of the last credit granted by the PPSC to the PSPN before the end of the service provisioning, which can be partly reimbursed.

According to an additional embodiment, the prepayment support node information PI, the credit information request and the credit information are comprised in MAP messages. The signalling interface is a MAP interface. In this way, the exchange of signalling messages between PSPN and PPSC as well as between PSPN and SPD is vendor-independent. This allows the flexible use of the present method and network node in various networks comprising elements from different suppliers. Furthermore, national and international roaming for prepaying subscribers can be provided effectively due to the commonly used signalling messages.

In one embodiment, at least one of the signalling messages, credit information request and credit information, comprises an interrogation request parameter indicating whether the signalling message is an initial one, a subsequent one or the last one related to the requested communications service. If this information is sent in the credit information request, the PPSC can easily detect, whether an internal charging process is to be setup in the case of an initial interrogation indication, to be continued in the case of a subsequent interrogation indication or to be finished in the case of a last interrogation indication. The same parameter sent in the credit information from the PPSC to the PSPN can serve for confirmation purposes.

According to a further embodiment, at least one of the signalling messages, credit information request and credit information, comprises a reference parameter identifying a dialogue between the prepaid service processing node PSPN and the prepayment support node PPSC. This allows a clear assignment of credit information requests and credit information messages, which is in particular useful if a plurality of communications services is processed at the same time for a subscriber. It allows the easy identification of signalling messages as belonging to the same charging transaction, if the same reference value is used for these messages.

In another embodiment, the signalling message credit information request comprises a service execution parameter indicating whether the requested communications service has been successfully executed. Therefore, the PPSC can efficiently detect, whether the balance of the subscriber account has to be finally updated with reference to a certain communications service charging.

According to another embodiment, the credit information comprises an interrogation indication parameter, indicating whether the prepayment support node PPSC expects a further interrogation from the prepaid service processing node PSPN for the communications service. This parameter can avoid unnecessary signalling traffic, if it indicates that a further interrogation is not expected, because, e.g., a certain communications service is free of charge. In this case the PSPN will not send further credit information requests during the processing of the communications service.

BRIEF DESCRIPTION OF THE DRAWINGS

In the following detailed description the present invention is described with reference to the accompanying drawings, wherein.

DETAILED DESCRIPTION

Figure 1:
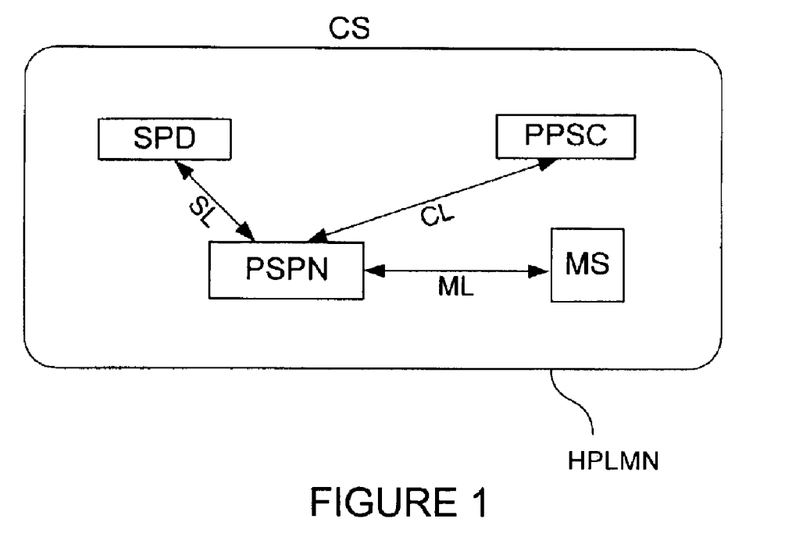
FIG. 1 depicts a cellular communications system consisting of a HPLM.

FIG. 1 shows a simplified representation of a communications system CS that comprises an HPLMN with a subscriber profile database SPD, a prepaid service processing node PSPN and a prepayment support node PPSC. Furthermore, a mobile station MS is located under the coverage of the HPLMN. Signalling links for a transmission of signalling information, or in other words control information, can be established between the elements, i.e. a link SL between SPD and PSPN, a link CL between PPSC and PSPN, and a link ML between MS and PSPN. Any links for the transmission of payload information are not shown in FIG. 1. The signalling links can represent either a direct or indirect signalling connection. To explain the latter case, the link ML between the MS and the PSPN is preferably realized via a radio base station (not shown in FIG. 1), and the links SL and CL can be realized, e.g., indirectly via a backbone, transit or separate signalling network (not shown in FIG. 1). The communications system CS can comprise a plurality of prepaid service processing nodes PSPN with corresponding signalling links SL, CL, but a mobile station MS is covered usually by a single PSPN at a time.

The prepayment support node PPSC administrates prepaid accounts of subscribers, who have concluded a contract with the operator of the HPLMN. The PPSC processes charging and billing tasks for prepaying subscribers, and in particular grants credits for a subscriber in response to a corresponding credit request from a prepaid service processing node PSPN. The prepaid service processing node PSPN processes prepaid services, which are requested from a mobile station MS of a subscriber. The processing comprises at least the detection of the request for the communications service that is to be charged on a prepaid account, the request of a credit information from the PPSC and the evaluation of the received credit information. The execution of the communications service itself can be performed by the PSPN or alternatively be controlled by the PSPN and performed by a further node.

The subscriber profile database SPD administrates subscriber profiles of subscribers that belong to the HPLMN. According to the present invention, the SPD stores for each prepaying subscriber the address of a corresponding PPSC. In order to facilitate the charging of a communications service and its processing at a PSPN, the SPD informs the PSPN on a subscriber base via the signalling link SL about the address of the corresponding PPSC, preferably when a corresponding subscriber's terminal gets under the coverage of a PSPN, e.g. by handover, by roaming or after being switched on. If the PSPN receives a request for a prepaid communications service, e.g. in a mobile originating case via the link ML, the node needs to know whether the prepayment account has enough credit for the payment of the requested service. The PSPN sends via the link CL a credit information request to the PPSC that is identified by the stored prepayment support node address PA. The PPSC evaluates the request, looks up the balance of the subscriber account, and sends a credit information back to the PSPN. The PSPN processes the requested communications service according to the credit information, e.g., the requested service is executed, if the credit information indicates that there are funds to cover that in the account, or otherwise the service request is rejected.

Figure 2:
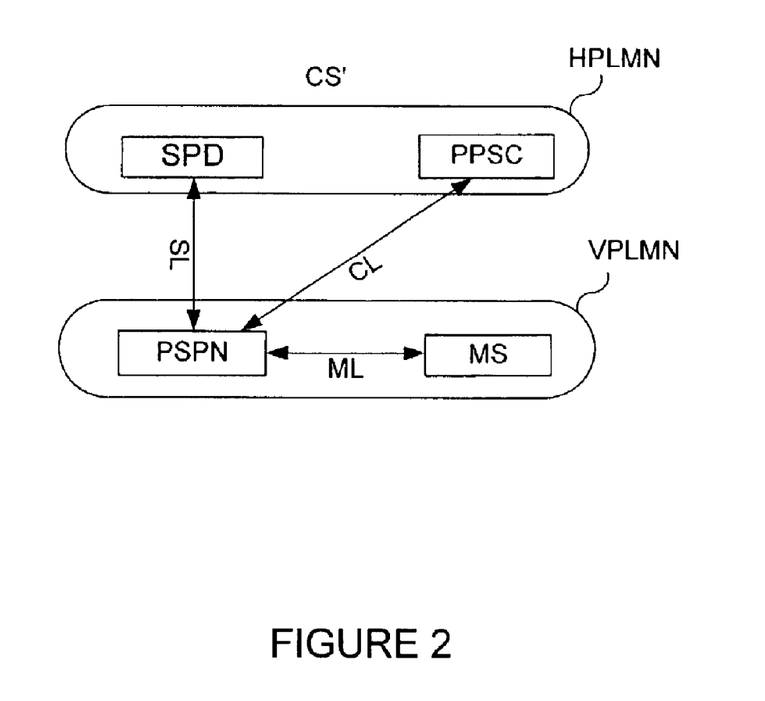
FIG. 2 illustrates a cellular communications system consisting of a HPLMN and a VPLMN.

FIG. 2 shows a simplified representation of an alternative communications system CS'. Its elements and the elements' functions correspond to those explained with reference to FIG. 1. In this example, the subscriber profile database SPD and the prepayment support node are located in the HPLMN, and the prepaid service processing node PSPN covering the terminal MS in the VPLMN. Therefore, the shown scenario is a national or international roaming of a subscriber. In particular in this traffic case information of the PSPN about the appropriate PSPN, which is indicated by the corresponding address, is essential, because the PSPN and the PPSC belong to different networks, which are usually provided by different operators. Otherwise, the information about the appropriate PPSC of a subscriber would not be available in the network, i.e. the VPLMN.

As explained above, the present invention is applicable in all types of cellular communications systems like GSM, GPRS or UMTS. With reference to FIG. 1 and FIG. 2, e.g. for a GSM system the subscriber profile database SPD can be the home location register HLR, a prepaid service processing node PSPN can be a mobile switching centre MSC or a mobile switching centre combined with a visitors location register MSC/VLR respectively, and the prepayment support node PPSC can be a prepaid service centre. Furthermore, the logical nodes of the communications system can be realized either by centralised nodes or in a distributed manner.

Figure 3:
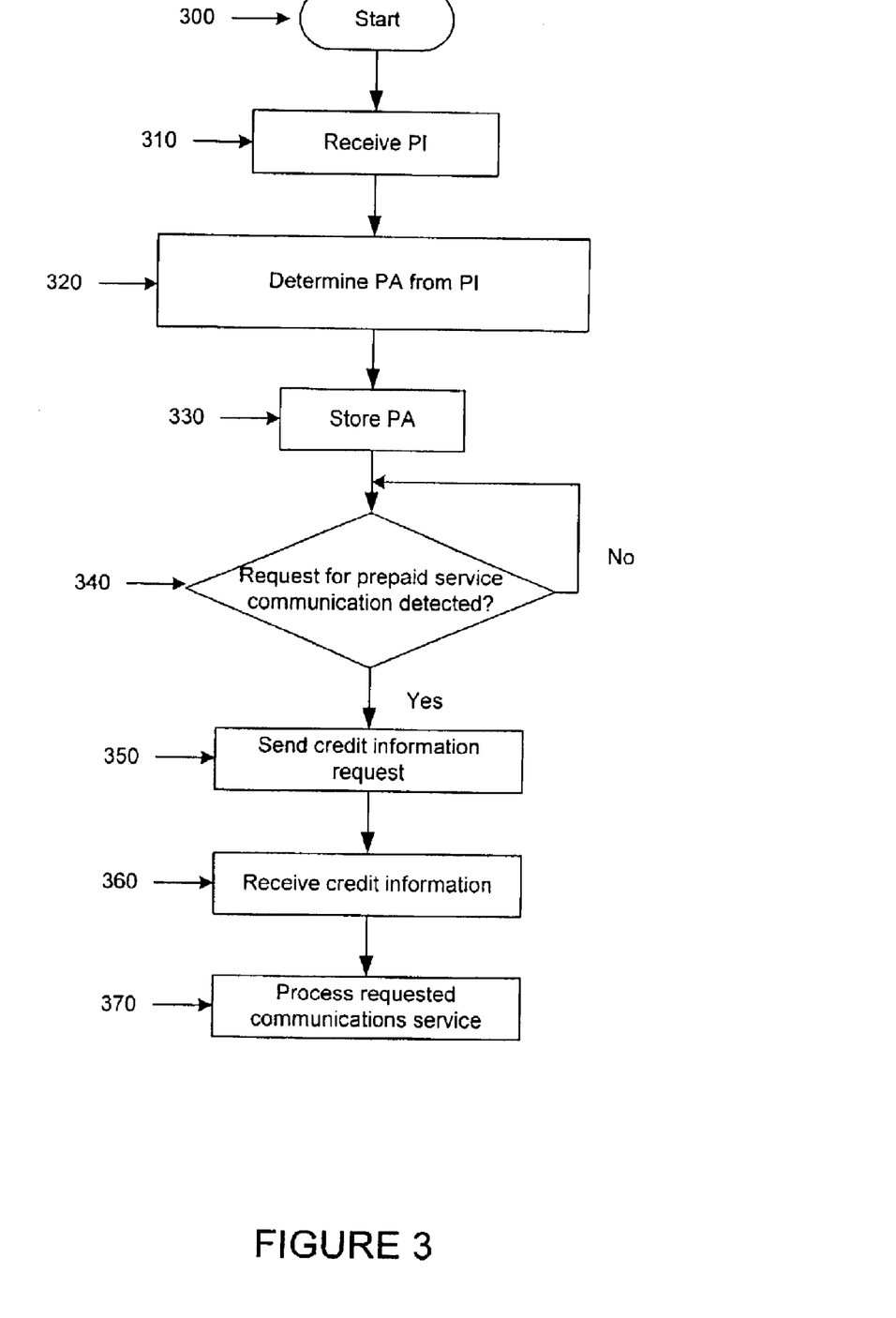
FIG. 3 depicts a flowchart of a charging procedure in accordance with a preferred embodiment of the present invention.

FIG. 3 illustrates a charging method for a communications service, e.g. executed in a prepayment processing node PSPN of a cellular communications system CS. In step 300, the process is started. A trigger for this can be, e.g., a handover, a roaming or the switching on of a subscriber's terminal. Any event that results in the terminal being covered by the PSPN can start the process.

In step 310, the PSPN receives a prepayment support node information PI, which is sent from a subscriber profile database SPD caused by the described trigger that has started the process. After reception, the PSPN determines in step 320 from the prepayment support node information PI a prepayment support node address PA indicating the prepayment support node, which administrates a prepaid service account of the corresponding subscriber, from the prepayment support node information PI. The determination can comprise an extraction of the prepayment support node address PA from other information like, e.g., subscriber identifier or further control information, a decoding as well as a conversion of the address, e.g. by means of a look-up-table, depending on the prepayment support node address format used. Afterwards, the prepayment support node address PA is stored 330, e.g. temporarily in a buffer or in a memory. Preferably, the subscriber-related prepayment support node address PA is stored in the subscriber data at the node.

After a request for a prepaid communications service, which can be received from a mobile terminal MS, e.g. in a mobile originated traffic case, or from any network element of the communications system, e.g. in a mobile terminating traffic case, is detected in step 340 by the PSPN, it sends in step 350 a credit information request to the prepayment support node PPSC of the corresponding subscriber. The request is sent to the PPSC that is identified by the stored prepayment support node address PA. A credit information is in step 360 received in response to the request from the PPSC. Then in step 370, the PSPN processes the requested communications service according to the credit information, i.e. the PSPN takes care of the execution of the requested service if the credit information indicates a valid credit, or it rejects the execution.

Figure 4:
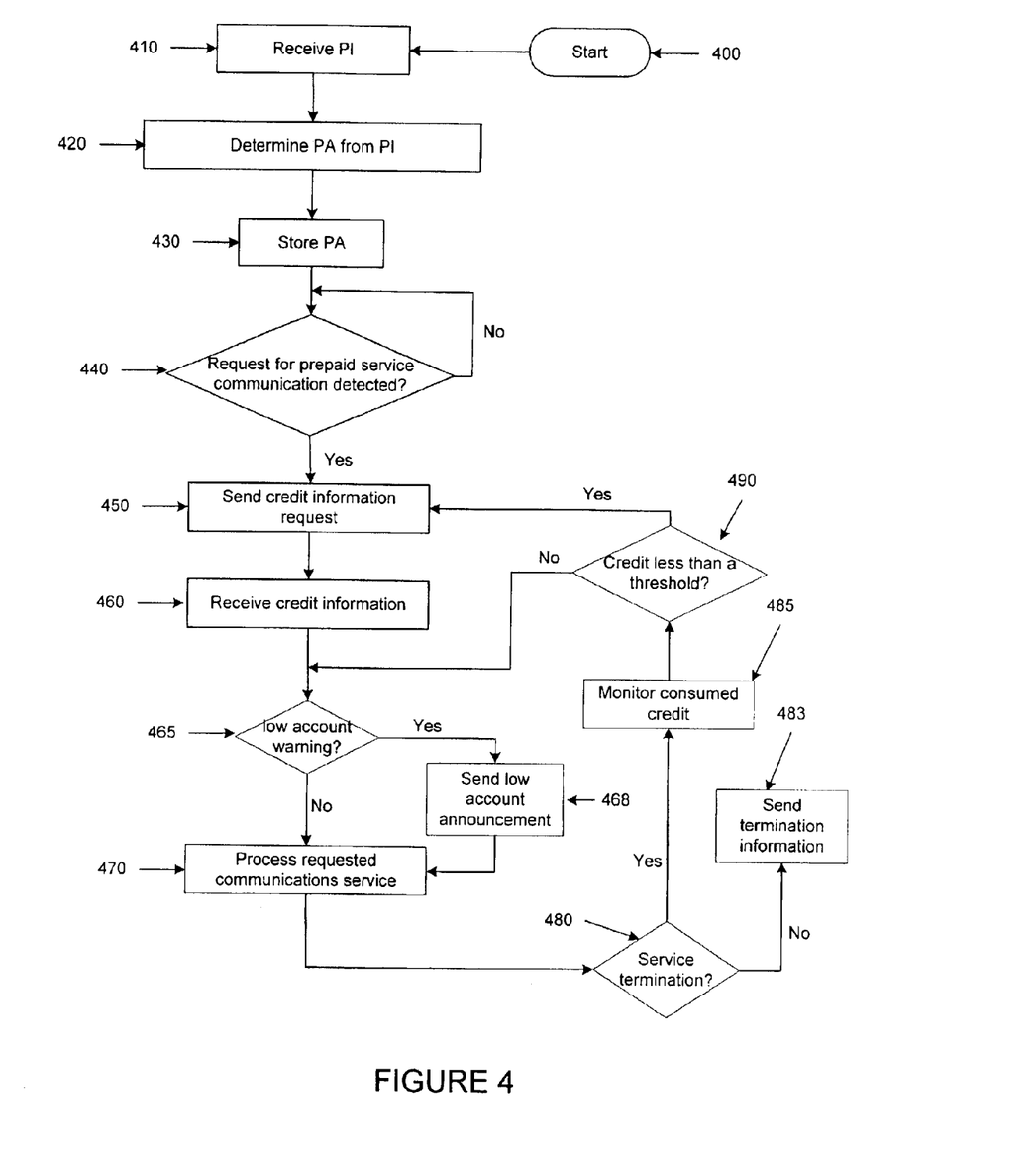
FIG. 4 illustrates a flowchart of an alternative charging procedure, in accordance with a preferred embodiment of the present invention.

FIG. 4 illustrates an alternative embodiment of the charging method. The charging method of FIG. 4 is the same as that disclosed in FIG. 3 through step 460—"Receive credit information." Step 470 in FIG. 4 corresponds to step 370 in FIG. 3. The PSPN detects in step 465 whether a low-account warning from the PPSC is received, either within the credit information or in a separate signalling message. If a low account warning is received, the PSPN signals in step 468 a warning to the subscriber terminal, e.g. by an announcement 488 via a signalling channel. Consequently, the terminal can signal this warning to the subscriber. A low account warning indicates that the service account balance is less than a certain account threshold. The warning allows the subscriber, e.g., to finish a phone call without being suddenly interrupted, or to refill the account in time.

Apart from the steps already described with reference to FIG. 3, the PSPN sends termination information to the PPSC in step 483 after the node detects in step 480 a communications service termination, e.g. when the subscriber has finished the phone call, or because of a rejection indicated in the received credit information. The termination information allows the PPSC to finalise the charging for the service and to perform a billing on the basis of the actually consumed credit.

If the service processing proceeds, the PSPN performs in step 485 a monitoring of the amount of credit, which is consumed by the executed service. In step 490 if the remaining credit is lower than a specific threshold, the PSPN sends again in step 450 a credit information request 450 to the PPSC. The remaining credit is calculated within the monitoring task in step 485 as the granted credit value that has been sent in the credit information deducted by the consumption. The specific threshold can be a fixed value or a certain percentage of the credit granted originally from the PPSC. In particular, repeated requests 450 of credit information can be applied to continuous communications services like speech calls or data transmissions with a time-based or a volume-based charging. If the newly requested credit is granted by the PPSC, the regular processing of the communications service proceeds or currently executed communications service is interrupted, i.e. terminated. In the latter case, a service termination information is sent to the PPSC as already explained above.

In a further embodiment (not shown in FIG. 4), the processing of the communications service according to the credit information is terminated, if the consumed credit value is equal or above the credit, which has been granted by the PPSC. This is useful, if a requested credit information is not received in a certain response time.

Figure 5A:
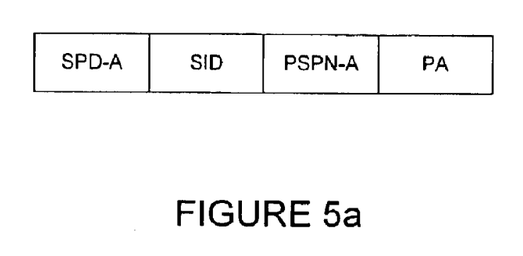
FIG. 5a depicts a block diagram with parameters of the prepayment support node information message, in accordance with a preferred embodiment of the present invention.

FIG. 5*a* shows an example of parameters comprised in a prepayment support node information PI message. The message comprises an address parameter SPD-A that identifies a sender of the message, i.e. the SPD. The message comprises further a subscriber identifier SID that indicates the subscriber, for which the message is valid. The subscriber identifier can be a standardised International Mobile Subscriber Identity IMSI, an IP-address or a proprietary parameter. The message 510 comprises further the address parameter PSPN-A, which is the address of the receiver of the message, i.e. a PSPN, and the prepayment support node address PA, which administrates a payment account for the subscriber identified by the subscriber identifier SID. The address parameters used in the message have preferably a format of an ISDN-number, but in alternative embodiments IP-addresses or proprietary address structures can be used.

Figure 5B:
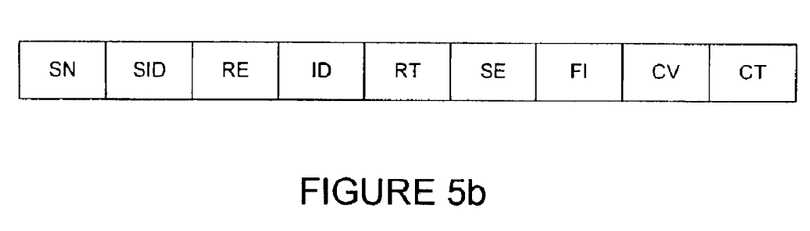
FIG. 5b illustrates a block diagram with parameters of credit information request and credit information messages in accordance with a preferred embodiment of the present invention.

FIG. 5*b* shows an example of parameters in a message, which can be a credit information request message or a credit information message respectively. The same parameter set and the same message structure can be used for this message pair. This allows the PPSC to respond in an efficient way to the request and makes acknowledgements easy because a conversion of the message fields is not necessary. The message shown in FIG. 5*b* comprises parameters of a credit information request or a credit information message respectively. The address formats of parameters in messages shown in FIG. 5*a* and FIG. 5*b* are preferably identical.

The message shown in FIG. 5*b* comprises an address parameter SN that identifies the sender of the message, i.e. a PSPN or a PPSC. A subscriber identifier SID indicates a subscriber, to which the message refers. The address of the receiver of the message, i.e. a PPSC or a PSPN, is given in the parameter RE. A reference parameter ID, e.g. in an Integer format, can be used to identify a credit information request message and a credit information message that belong logically together and build a message pair. The reference parameter ID can be used, to identify a charging transaction, which can comprise several message pairs of credit information request and credit information messages.

A request type parameter RT indicates, whether the credit information request, respectively the credit information, is an initial one, a subsequent one or the last one that is related to a charging of a specific communications service. The PPSC can use this parameter to control the opening, the continuation and the closing of a charging transaction that comprises a sequence of credit information request/credit information message pairs. The parameter RT has preferably an Integer format. Valid values are, e.g., 0 for an initial message, 1 for a subsequent message and 2 for a final message.

The message shown in FIG. 5*b* comprises a parameter SE that indicates whether a communications service has been successfully executed. The PPSC can finally update the subscriber account balance after the successful service execution is indicated via the SE parameter. Preferably, the SE parameter has a Boolean format.

The parameter FI indicates, whether the PPSC expects a further credit information request message for a certain charging transaction. E.g., if the processing of a certain communications service is free of charge, the PPSC will send via the FI parameter an indication to the PSPN, that no further messages related to said charging transaction are necessary. The parameter format is preferably a Boolean format.

The parameter CV indicates a credit value that is requested by the PSPN, respectively allowed by the PPSC. The parameter can have, e.g., an Integer or a Real format. The value can represent different types of credit, e.g., an amount of airtime or an amount of traffic volume. A type of credit can be assigned to a chargeable activity each. The type of credit, which is represented by the parameter CV, is indicated by the parameter CT. The format of the parameter can be, e.g., a String or an Integer format. In order to use the latter format, the operator has to define a corresponding coding scheme.

In a preferred embodiment, the signalling messages prepayment support node information PI, credit information request and credit information are so-called MAP messages. For details on MAP it is referred to the ETSI specification GSM 09.02, version 7.3.0.

Figure 6:
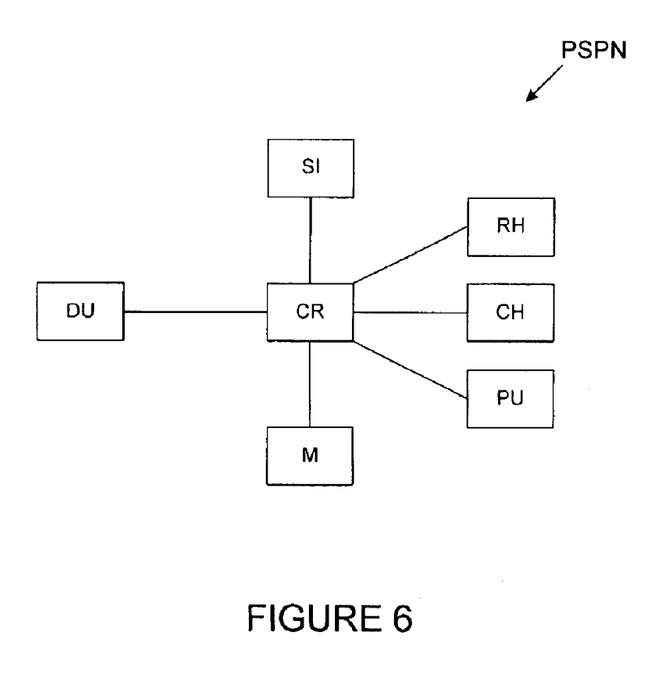
FIG. 6 depicts a block diagram of a PSPN in accordance with a preferred embodiment of the present invention.

FIG. 6 shows in an exemplary embodiment of essential elements of a PSPN. Apart from a controller CR, which controls the processing of prepaid communications services and charging transactions at the PSPN, and a corresponding processing unit PU, there are a determination unit DU to determine from a prepayment support node information PI a prepayment support node address PA. In one embodiment, this determination is performed by a read-out operation of the PA parameter from the PI. A memory M stores the address PA. A request handler RH detects requests for communications services, which indicate that the charging for these services should be done to a prepaid account. Alternatively, the request handler can check, whether a requesting subscriber has an entry in the memory M, i.e. whether a prepayment support node address PA is stored for the subscriber. A credit information handler CH sends credit information requests to the PPSC that is identified by the stored prepayment support node address PA. The credit information handler CH receives credit information messages, which are used by the controller CR for the controlling of the processing of the communications service with respect to the provision, rejection or termination of the service.

The signalling messages prepayment support node information PI, credit information request and credit information are exchanged with the communications system via the interface SI. In the embodiment of FIG. 6, the interface SI is connected to the controller CR. All other shown elements of the PSPN are connected to the controller as well. A person skilled in the art can derive easily further possible implementations, e.g. a ring or a bus can be used to connect the elements of the PSPN. In a further embodiment, the controller CR can comprise at least on of the credit information handler, the request handler and the determination unit. These elements of the PSPN can be realized either in hardware, in software or in a combination thereof. In a preferred embodiment, the interface SI is a MAP message interface.

In further embodiments, the invention applies to a fixed network or to a hybrid network, i.e. an integrated fixed and mobile communication network. In these cases, the signalling messages are preferably comprised in Transaction Capability Application Part TCAP messages, and the interface SI is a TCAP message interface. In one embodiment, the communication system CS comprises a fixed network, wherein the SPD and the PSPN are integrated in a single network node. In an alternative embodiment, the communication system comprises a fixed network for the home network and the visited network each. In this case, the SPD is preferably located in the home network, wherein the PSPN is located in the visited network. The use of TCAP messages in these embodiments supports services like the so-called personal number service.

What is claimed is:

1. A charging method for a communications service in a cellular communications system, wherein a prepaid service processing node (PSPN) processes a communications service, comprising the steps of:

receiving a subscriber-specific prepayment support node information (PI) from a subscriber profile database (SPD) located in a home network of the subscriber;

determining a prepayment support node address (PA) from the prepayment support node information (PI);

storing the determined prepayment support node address (PA);

detecting a request for the communications service to be charged on a subscriber's prepayment account, which comprises the steps of:

sending a credit information request to the prepayment support node (PPSC) identified by the stored prepayment support node address (PA), receiving a credit information, and processing the requested communications service according to the credit information.

2. The method according to claim 1, further comprising the step of sending prepaid services processing capabilities of the prepaid service processing node (PSPN) to the subscriber profile database (SPD) for evaluation in a communication service setup.

3. The method according to claim 1, wherein the step of processing the requested communications service further comprises a charging by another prepayment method.

4. The method according to claim 3 wherein the prepayment support node information (PI) further comprises charging information about different types of communications services, and wherein the prepaid service processing node (PSPN) processes the requested prepaid communications service according to said charging information.

5. The method according to claim 4, wherein the credit information comprises an allowed amount of airtime.

6. The method according to claim 5, wherein the credit information comprises an allowed amount of traffic volume.

7. The method according to claim 6, wherein the credit information comprises an approval or a rejection for the processing of the requested communications service.

8. The method according to claim 7, further comprising the step of consuming a credit value, which is received in the credit information, according to the processing of the requested communications service.

9. The method according to claim 8, further comprising the steps of:

calculating a remaining credit by deducting the consumption from the credit value; and sending an additional credit information request to the prepayment support node (PPSC) whenever the remaining credit falls below a first threshold.

10. The method according to claim 9, further comprising the steps of:

receiving an account warning, which is sent by the prepayment support node (PPSC), if the credit value of the subscriber account falls below a second threshold, and sending an announcement of a low account credit to a communications device (MS), which has requested the communications service.

11. The method according to claim 10, further comprising the step of sending a service termination information to the prepayment support node (PPSC), when the processed communications service has been terminated.

12. The method according to claim 11, wherein the prepayment support node information (PI), the credit information request and the credit information are comprised in MAP messages.

13. The method according to claim 12, wherein at least one of the signalling messages credit information request and credit information comprises an interrogation request parameter indicating whether the signalling message is an initial one, a subsequent one or the last one related to the requested communications service.

14. The method according to claim 13, wherein at least one of the signalling messages, credit information request and credit information, comprises a reference parameter identifying a dialogue between the prepaid service processing node (PSPN) and the prepayment support node (PPSC).

15. The method according to claim 14, wherein the signalling message credit information request comprises a service execution parameter indicating whether the requested communications service has been successfully executed.

16. The method according to claim 15, wherein the credit information comprises an interrogation indication parameter, indicating whether the prepayment support node (PPSC) expects a further interrogation from the prepaid service processing node (PSPN) for the communications service.

17. A prepaid service processing node (PSPN) in a communications system, comprising
   a processing unit (PU) for processing prepaid communications services,
   a controller (CR) to control the processing of the communications service by the processing unit (PU) and for a charging of the communications service,
   a signalling interface (SI) to send and receive signalling information,
   a determination unit (DU) to determine a prepayment support node address (PA) of a prepayment support node (PPSC) from a subscriber-specific prepayment support node information (PI) received via the signalling interface (SI) and initiate the storing of the determined prepayment support node address (PA) in a memory(M),
   a request handler (RH) to detect a request for a communications service to be charged on a subscriber's prepayment account at the prepayment support node (PPSC), and
   a credit information handler (CH) to send a credit information request to the prepayment support node (PPSC) identified by the stored prepayment support node address (PA) and to receive a credit information via the signalling interface (SI) and forward it to the controller (CR).

18. The prepaid service processing node (PSPN) according to claim 17, comprising
   a processing capability handler to send prepaid services processing capabilities of the prepaid service processing node (PSPN) to a subscriber profile database (SPD).

19. The prepaid service processing node (PSPN) according to claim 18 wherein the controller controls a charging of the requested communications service by another prepayment method.

20. The prepaid service processing node (PSPN) according to claim 17, comprising a disconnection handler to terminate the requested communications service if the credit information received from the prepayment support node (PPSC) comprises a rejection of the processing of the requested communications service.

21. The prepaid service processing node (PSPN) according to claim 20, wherein a credit value, which is received in the credit information, is consumed according to the processing of the requested communications service.

22. The prepaid service processing node (PSPN) according to claim 21, wherein
   the controller calculates a remaining credit by deducting the consumption from the credit value, and the credit information handler sends an additional credit information request to the prepayment support node (PPSC), whenever the remaining credit falls below a first threshold.

23. The prepaid service processing node (PSPN) according to claim 22, further comprising an announcement handler to send an announcement of a low account credit to a communications device (MS), which has requested the communications service, if an account warning is received from the prepayment support node (PPSC).

24. The prepaid service processing node (PSPN) according to claim 23, wherein the controller sends a service termination information to the prepayment support node (PPSC), if the processed communications service has been terminated.

25. The prepaid service processing node (PSPN) according to claim 24, wherein the signalling interface is a MAP interface.

26. The prepaid service processing node (PSPN) according to claim 25, wherein the controller controls the processing of the requested prepaid communications service according to a charging information about different types of communications services, which is comprised in the prepayment support node information (PI).

* * * * *